United States Patent
Wakao et al.

(10) Patent No.: US 7,006,899 B2
(45) Date of Patent: Feb. 28, 2006

(54) ELECTRICAL LOAD CONTROLLING DEVICE

(75) Inventors: Hisaaki Wakao, Kariya (JP); Kiyoshige Kato, Aichi-ken (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 182 days.

(21) Appl. No.: 10/648,299

(22) Filed: Aug. 27, 2003

(65) Prior Publication Data

US 2004/0044459 A1    Mar. 4, 2004

(30) Foreign Application Priority Data

Aug. 27, 2002 (JP) ............................. 2002-247065
Oct. 10, 2002 (JP) ............................. 2002-297393

(51) Int. Cl.
| G05D 11/00 | (2006.01) |
| G05D 17/00 | (2006.01) |
| G05D 3/00 | (2006.01) |
| G05D 5/00 | (2006.01) |
| G05D 9/00 | (2006.01) |

(52) U.S. Cl. .................... 700/286; 701/34; 701/72; 701/89; 180/248; 477/3; 477/64; 477/125

(58) Field of Classification Search .............. 701/69, 701/34, 72, 89; 477/3, 64, 125; 180/248; 307/10.1; 700/286
See application file for complete search history.

(56) References Cited

U.S. PATENT DOCUMENTS

| 3,566,717 | A | * | 3/1971 | Berman et al. ................. 477/3 |
| 4,589,401 | A | | 5/1986 | Karim et al. |
| 5,089,804 | A | | 2/1992 | Mimura |
| 5,574,320 | A | | 11/1996 | Shirai et al. |
| 5,669,848 | A | * | 9/1997 | Kondo et al. ................. 477/64 |
| 5,710,465 | A | * | 1/1998 | Saito et al. ................. 307/10.1 |
| 5,738,607 | A | * | 4/1998 | Kondo et al. ................. 477/125 |
| 5,825,097 | A | * | 10/1998 | Saito et al. ................. 307/10.1 |
| 5,886,419 | A | * | 3/1999 | Saito et al. ................. 307/10.1 |
| 6,452,286 | B1 | * | 9/2002 | Kubo et al. ................. 290/40 C |
| 6,480,771 | B1 | * | 11/2002 | Nishida et al. ................. 701/34 |
| 6,493,623 | B1 | * | 12/2002 | Nishida et al. ................. 701/89 |
| 6,493,624 | B1 | * | 12/2002 | Nishida et al. ................. 701/89 |
| 6,587,775 | B1 | * | 7/2003 | Nishida et al. ................. 701/89 |
| 6,665,162 | B1 | * | 12/2003 | Nishida et al. ................. 361/81 |
| 6,850,830 | B1 | * | 2/2005 | Nishida et al. ................. 701/69 |
| 2001/0025734 | A1 | * | 10/2001 | Nishida et al. ............. 180/248 |
| 2001/0027362 | A1 | * | 10/2001 | Nishida et al. ................. 701/34 |
| 2001/0027369 | A1 | * | 10/2001 | Nishida et al. ................. 701/89 |
| 2001/0027907 | A1 | | 10/2001 | Nishida et al. |
| 2002/0002436 | A1 | * | 1/2002 | Nishida et al. ................. 701/72 |
| 2002/0147537 | A1 | * | 10/2002 | Nishida et al. ................. 701/69 |

* cited by examiner

*Primary Examiner*—Thomas G. Black
*Assistant Examiner*—McDieunel Marc
(74) *Attorney, Agent, or Firm*—Oblon, Spivak, McClelland, Maier & Neustadt, P.C.

(57) ABSTRACT

A hunting detecting device used for an electrical load detecting device sets a current command value for an electrical load. Based on a deviation between a current that actually flows through the electrical load and the current command value, the hunting detecting device performs at least proportional control in a group including proportional control, integral control, and differential control. The hunting detecting device sends a current generated based on the performed control to the electrical load. A current determining device determines whether there is a current through the electrical load. When the current determining device determines that there is a current through the electrical load, a hunting detector detects a number of times of hunting within a predetermined period.

21 Claims, 6 Drawing Sheets

Short Circuit Malfunction

ELECTRICAL LOAD CONTROLLING DEVICE

CROSS-REFERENCE TO RELATED APPLICATIONS

This application is based upon and claims the benefit of priority from prior Japanese Patent Applications No. 2002-247065, filed on Aug. 27, 2002 and No. 2002-297393, filed on Oct. 10, 2002, the entire contents of which are incorporated herein by reference.

BACKGROUND OF THE INVENTION

The present invention relates to an electrical load controlling device, which is capable of detecting hunting and a short circuit. The present invention also relates to a hunting detecting method and a short circuit detecting method.

Typically, a driving force distributor of a four wheel drive vehicle directly transmits power from a transmission either to the front wheels or to the rear wheels, and distributes and transmits the power to the other ones of the front wheels and the rear wheels through a variable torque clutch mechanism. The transmitted torque is regulated for regulating the distribution of driving force to the front wheels and the rear wheels.

An electromagnetic type variable torque clutch mechanism is known in the art. An electromagnetic type variable torque clutch mechanism is controlled by a driving force distribution controlling device (ECU). By controlling a current value to an electromagnetic solenoid with the ECU, the frictional contact force between clutch plates is variably controlled. The engaging force of the clutch plates is controlled, accordingly. As a result, the transmitted torque is controlled.

Specifically, the ECU generates a current command value. To eliminate the deviation between the current command value and an actual current (detected current) supplied to the electromagnetic solenoid, the ECU computes the current command value and a duty ratio of the current command value through the PI control (proportional-plus-integral control) and the PWM control. The ECU then sends a control signal corresponding to the duty ratio to the drive circuit, thereby controlling the electromagnetic solenoid.

When there is malfunction of the electromagnetic solenoid due to a short circuit established between the terminals, and the ECU is sending out the control signal, an excessive current (actual current) flows if a field-effect transistor (FET) of the drive circuit is turned on. However, since the ECU is executing the PI control, the ECU lowers the duty ratio upon reception of an excessive actual current to control the electromagnetic solenoid such that the current is lowered to zero amperes 0A or a value close to zero amperes. When the current is lowered to zero amperes or the value close to zero amperes, the ECU executes a control for again flowing a current through the electromagnetic solenoid, which again causes an excessive current to flow. This dropping of the value of the current to zero amperes or to the value close to zero is called hunting.

Conventionally, a number of means for detecting current abnormalities such as an excessive current are known. However, these means operate on a logic designed for detecting a stationary abnormality, that is, a state in which a current is always more than a certain value. Therefore, these means cannot detect the above-noted hunting caused by a short circuit.

SUMMARY OF THE INVENTION

Accordingly, it is an objective of the present invention to provide an electrical load controlling device that is capable of detecting hunting phenomena.

To achieve the foregoing and other objectives and in accordance with the purpose of the present invention, a hunting detecting device for an electrical load controlling device is provided. The electrical load controlling device sets a current command value for an electrical load. Based on a deviation between a current that actually flows through the electrical load and the current command value, the electrical load controlling device performs at least proportional control in a group including proportional control, integral control, and differential control. The electrical load controlling device sends a current generated based on the performed control to the electrical load. The electrical load controlling device includes a current determining device (current determining means) and a hunting detector (hunting detector means). The current determining device determines whether there is a current through the electrical load. When the current determining device determines that there is a current through the electrical load, the hunting detector detects the number of times of hunting occurs within a predetermined period.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF PREFERRED EMBODIMENTS

A driving force distribution controlling device 31 according to a first embodiment of the present invention will now be described with reference to FIGS. 1 to 4. The driving force distribution controlling device 31 is used in a four wheel drive vehicle 11, in which the front wheels are always driven when the vehicle 11 is running. The driving force distribution controlling device 31 functions as an electrical load controlling device, a hunting detecting device, and a short circuit detecting device.

Figure 1:
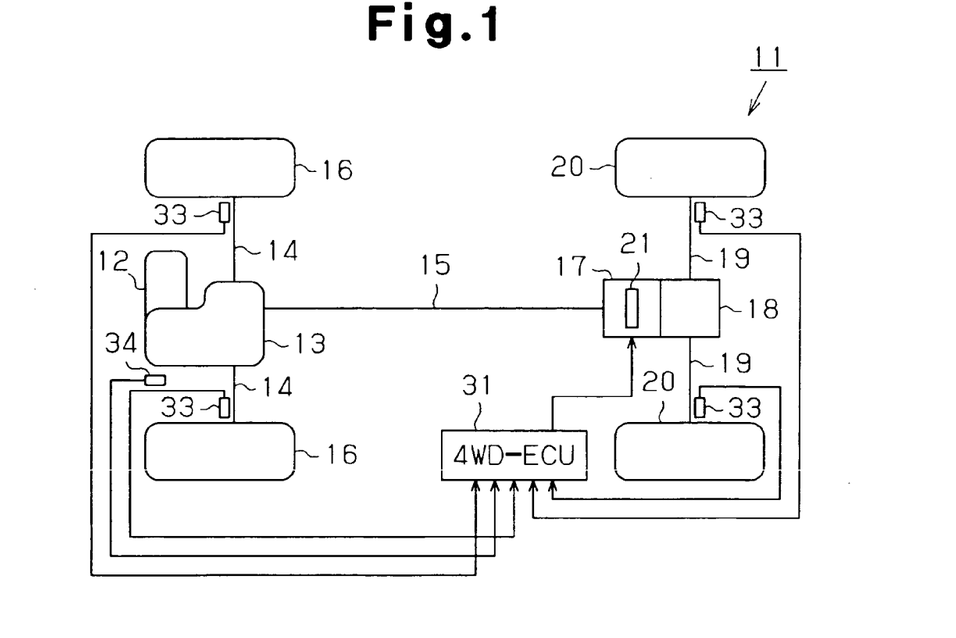
FIG. 1 is a diagrammatic view illustrating a four wheel drive vehicle according to a first embodiment.

As shown in FIG. 1, the four wheel drive vehicle 11 has a drive source, which is an engine 12 in this embodiment, and a transaxle 13. The transaxle 13 includes, for example, a transmission and a transfer. The transaxle 13 is coupled with a pair of front axles 14 and a propeller shaft 15. The front axles 14 are coupled with front wheels 16. The propeller shaft 15 is coupled to a driving force transmitting device (a coupling) 17. The driving force transmitting device 17 is coupled with a rear differential 18 with a drive pinion shaft (not shown). The rear differential 18 is coupled to rear wheels 20 with a pair of rear axles 19.

The driving force of the engine 12 is transmitted to the front wheels 16 by the transaxle 13 and the front axles 14. When the propeller shaft 15 is coupled to the drive pinion shaft with the driving force transmitting device 17 to transmit torque, the driving force of the engine 12 is transmitted to the rear wheels 20 by the propeller shaft 15, the drive pinion shaft, the rear differential 18, and the rear axles 19.

The transaxle 13, the front axles 14, the propeller shaft 15, the drive pinion shaft, the driving force transmitting device 17, the rear differential 18, and the rear axles 19 form a driving force transmitting system.

The driving force transmitting device 17 includes an electromagnetic clutch mechanism 21, which is a multiple disk hydraulic wet clutch. The electromagnetic clutch 21 has clutch plates (not shown) that are selectively engaged by friction and separated from each other. The electromagnetic clutch mechanism 21 includes an electrical load, which is an electromagnetic solenoid 22 (see FIG. 2). When current is supplied to the electromagnetic solenoid 22, the clutch plates engage with each other and torque (driving force) is transmitted between the front and rear wheels 16, 20. When no current is supplied to the electromagnetic clutch mechanism 21, the clutch plates separate from each other and prevent transmission of torque between the front and rear wheels 16, 20.

The frictional engaging force of the clutch is increased and decreased in accordance with the amount (strength) of current supplied to the electromagnetic solenoid 22. Transmitted torque between the front wheels 16 and the rear wheels 20 is arbitrarily adjusted by controlling the amount of current supplied to the electromagnetic solenoid 22. As the frictional engaging force of the clutch plates increases, the transmitted torque between the front wheels 16 and the rear wheels 20 is increased. Conversely, as the frictional engaging force of the clutch plates decreases, the transmitted torque between the front wheels 16 and the rear wheels 20 is decreased.

A current is supplied to the electromagnetic solenoid 22 by an electronic control unit for distributing driving force (hereinafter referred to the driving force distribution controlling device 31 (4WD-ECU)). The driving force distribution controlling device 31 feeds and stops current to the electromagnetic solenoid 22, and adjusts the amount of the supplied current. That is, the driving force distribution controlling device 31 controls the frictional engaging force of the clutches in the electromagnetic clutch mechanism 21, thereby selecting one of a four wheel drive mode and two wheel drive mode, and controlling the driving force distribution ratio (torque distribution ratio) of the front wheels 16 and the rear wheels 20 in the four wheel drive mode.

The driving force distribution controlling device 31 of the four wheel drive vehicle 11 will now be described with reference to FIG. 2.

Figure 2:
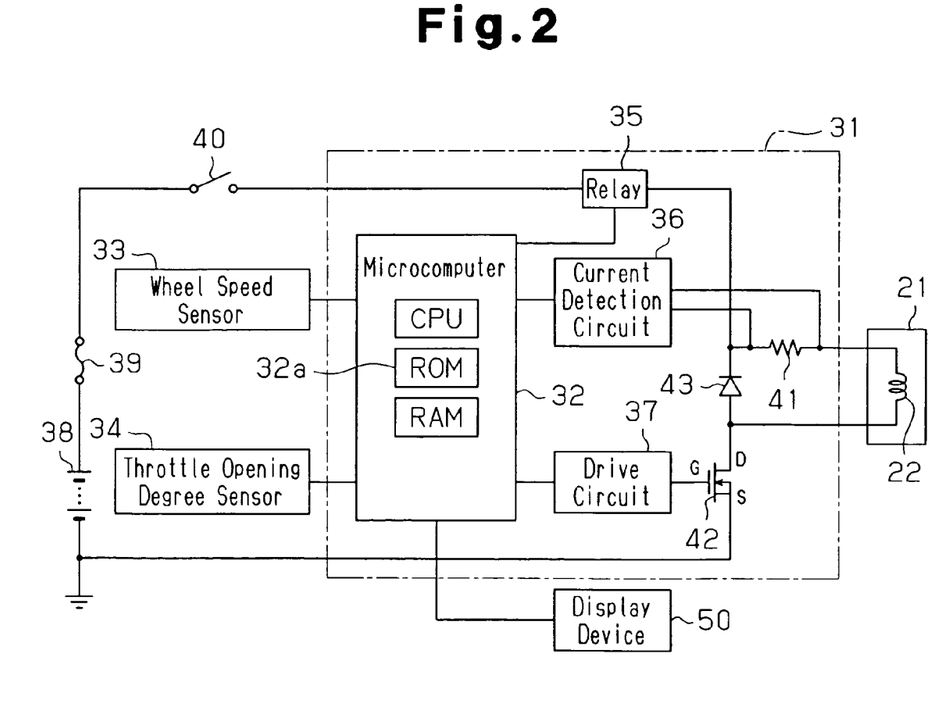
FIG. 2 is a circuit diagram illustrating a driving force distribution controlling device according to the first embodiment.

As shown in FIG. 2, the driving force distribution controlling device, or a controller 31 of the four wheel drive microcomputer 32 includes a central processing unit (CPU), a random access memory (RAM), a read only memory (ROM) 32a, which functions as a memory device, and an input-output interface.

The microcomputer 32 functions as a current determining device (current determining means), a hunting detector (hunting detector means), a duty ratio determining device (duty ratio determining means), an abnormality determining device (abnormality determining means), a cumulative number counting device (cumulative number counting means), a short circuit determining device (short circuit determining means), and a relay controlling device (relay controlling means).

The ROM 32a stores several types of control programs executed by the microcomputer 32 and several types of data and characteristic maps. The maps are obtained based on, for example, experimental data of a vehicular model and conventional theoretical calculations. The RAM is a working area in which the CPU of the driving force distribution controlling device 31 executes the control programs stored in the ROM 32a to perform several computations (for example, computations for controlling current to the electromagnetic solenoid 22).

The microcomputer 32 is connected to wheel speed sensors 33, a throttle opening degree sensor 34, a relay (relay means) 35, a current detection circuit 36, a drive circuit 37, and an engine controller (not shown) with an input-output inter face (not shown), respectively.

The wheel speed sensors 33 are each located in the vicinity of one of the front wheels 16 and the rear wheels 20. The four wheel speed sensors 33 detect the wheel speed (the number of rotation per unit time of a wheel, that is, rotational speed) of each of the front and rear wheels 16, 20 independently, and send detection results (wheel speed signals) to the microcomputer 32.

The throttle opening degree sensor 34 is connected to a throttle valve (not shown) to detect the opening degree of the throttle valve (throttle opening degree θ), or the depression amount of an acceleration pedal (not shown) when a driver depresses the pedal. The throttle opening degree sensor 34 sends a detection result (depression amount signal) to the microcomputer 32.

The four wheel drive vehicle 11 also has a battery 38. The terminals of the battery 38 are connected to a series circuit, which includes a fuse 39, an ignition switch 40, a relay (relay means) 35, a shunt resistor 41, the electromagnetic solenoid 22, and a field-effect transistor (hereinafter referred to as FET 42).

The terminals of the shunt resistor 41 are connected to input terminals of the current detection circuit 36. Based on the voltage between the terminals of the shunt resistor 41, the current detection circuit 36 detects a current through the shunt resistor 41 (an actual current, which is also referred to as detected current for the sake of convenience). The current detection circuit 36 sends the detected current to the microcomputer 32. Based on information sent from the current detection circuit 36, the microcomputer 32 computes an actual current through the electromagnetic solenoid 22 of the electromagnetic clutch 21.

The terminals of the electromagnetic solenoid 22 are connected to a flywheel diode 43. The flywheel diode 43 releases a counter electromotive force generated when the FET 42 is turned off, thereby protecting the FET 42. The gate G of the FET 42 is connected to an output terminal of the drive circuit 37. The source S of the FET 42 is connected to the minus terminal of the battery 38. The node of the source S and the minus terminal is grounded.

When the ignition switch 40 is turned on (closed), electricity is supplied to the microcomputer 32 from an electrical power source, which is the battery 38, through a power source circuit (not shown). Then, based on various information (detected signals) from the wheel speed sensors 33 and the throttle opening degree sensor 34, the microcomputer 32 executes various control programs such as a program for controlling the driving force distribution, and computes the amount of the current (command current value) supplied to the electromagnetic solenoid 22.

Specifically, based on various information obtained from the wheel speed sensors 33 and the throttle opening degree sensor 34, that is detected signals, the microcomputer 32 generates or sets the current command value supplied to the electromagnetic solenoid 22. The microcomputer 32 then computes a PI control value through PI control (proportional-plus-integral control) to eliminate the deviation between the current command value and the actual current through the electromagnetic solenoid 22, or the deviation between the current command value and the detected current. Further, the microcomputer 32 performs PWM computation according to the computed PI control value to determine the duty ratio. The microcomputer 32 sends the result of the PWM computation to the drive circuit 37.

The drive circuit 37 performs on/off control (PWM control) of the FET 42, such that a current corresponding to the duty ratio is supplied to the electromagnetic solenoid 22. That is the microcomputer 32 controls the amount of current supplied to the electromagnetic solenoid 22, thereby variably controls the driving force distribution to the front wheels and the rear wheels.

When the ignition switch 40 is turned off (opened), the electricity supply to the microcomputer 32 is stopped.

A warning device (warning means), which is a display device 50, is connected to the microcomputer 32. The display device 50 displays various images based on control signals from the microcomputer 32.

An operation of the driving force distribution controlling device 31 as described above will now be described with reference to FIGS. 3, 4(*a*), and 4(*b*).

Figure 3:
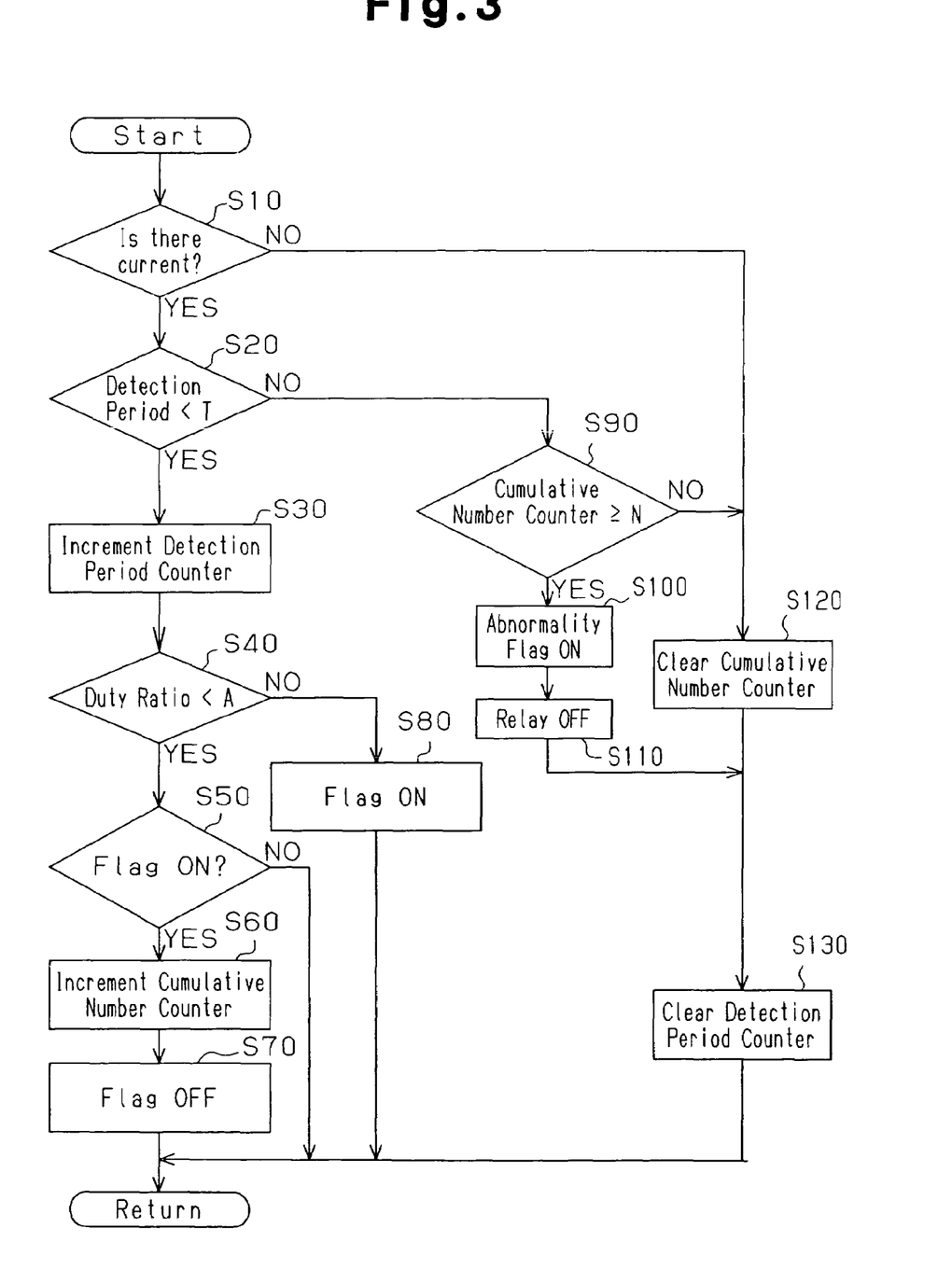
FIG. 3 is a flowchart showing a program of a short circuit detection control according to the first embodiment.

FIG. 3 is a flowchart showing a control program for detecting a short circuit. This program is stored in the ROM 32*a* in advance and is executed by the microcomputer 32 of the driving force distribution controlling device 31.

The microcomputer 32 executes this control program at a predetermined control cycle.

In step S10, the microcomputer 32 determines whether the a current is flowing through the solenoid 22. If the controller 31 is not receiving a current, the microcomputer 32 proceeds to step S120. If the controller 31 is receiving a current, the microcomputer 32 proceeds to step S20.

Step S10 corresponds to an operation of a current determining device (current determining means) and to a step for determining whether there is a current.

Step S20 is a step for determining whether a period of detecting the number of times hunting reaches a predetermined period T. In step S20, the microcomputer 32 determines whether a detection period τ is less than the predetermined period T. The predetermined period is short and for example one second. The predetermined time is not limited to one second.

If the detection period τ is less than the predetermined period T, the outcome of step S20 is positive, and the process proceeds to step S30. If the detection period τ is equal to or more than the predetermined period T, the process proceeds to step S90. The detection period τ is the count value of a detection period counter.

In step S30, the microcomputer 32 increments the detection period counter, and proceeds to step S40.

Steps S40 to S80 are designed for detecting hunting, and correspond to a procedure of a hunting detector (hunting detector means), or to a step for detecting the number of times of hunting.

In step S40, whether the duty ratio is less than a predetermined threshold value A is determined. In this embodiment, the duty ratio threshold value A is, for example, 5%, which is close to zero. However, the threshold value A is not limited to 5%.

If the duty ratio is less than the threshold value A in step S40, the outcome of step S40 is positive. In this case, the process proceeds to step S50. If the duty ratio is equal to or more than the threshold value A, the outcome is negative. In this case, the process proceeds to step S80. In step S80, an indicator flag indicating that the duty ratio is equal to or more than the threshold value is set to ON. Thereafter, the control program is temporarily terminated.

In step S50, whether the indicator flag is ON is determined. That is, in step S50, whether the indicator flag was set to ON in the previous control cycle is determined.

If the indicator flag is ON, the outcome of step S50 is positive, and the process proceeds to step S60. If the indicator flag is not ON, the outcome is negative. In this case, the control program is temporarily terminated.

In step S60, the microcomputer 32 increments a cumulative number counter. In step S70, the microcomputer 32 sets the indicator flag to OFF, and temporarily terminates the control program. Steps S50 and S60 correspond to a step for counting the cumulative number.

As described above, if the outcome of step S40 is negative, the indicator flag is set to ON in step S80. Therefore, if the outcome of step S40 is positive in the subsequent control cycle, the outcome of step S50 will be positive, and the cumulative number counter will be incremented in step S60. In this manner, the microcomputer 32 detects hunting, and accumulates the number of times of hunting by incrementing the number in step S60.

Step S40 corresponds to a procedure of a duty ratio determining device (duty ratio determining means), and step S60 corresponds to a procedure of a cumulative number counting device (cumulative number counting means).

Steps S90 to S110 include a procedure for an abnormal determination of the cumulative number of times of hunting and a procedure for a case where the cumulative number of times is equal to or more than an abnormality determination value.

If the detection period τ is elapsed to be equal to or more than the predetermined period T, the outcome of step S20 is negative. In this case, in step S90, if the value of the cumulative number counter, which is counted in the detection period τ is equal to or more than N (predetermined number of times), which is set as an abnormality determination value, the microcomputer 32 judges that the outcome is positive. That is, the microcomputer 32 determines that there is an abnormality in the electromagnetic clutch mechanism 21, that is, that a short circuit is established in the solenoid 22 of the electromagnetic clutch 21. Then, the microcomputer 32 proceeds to step S100. If the value of the cumulative number counter is less than N, the microcomputer 32 determines that the outcome of step S90 is negative, and proceeds to step S120.

In step S100, since the outcome of step S90 was positive, an abnormality flag is set to ON. The process then proceeds to step S110.

Steps S90 and S100 correspond to a procedure of a short circuit determining device (short circuit determining device), that is, a step for determining a short circuit.

In step S110, the microcomputer 32 turns off the relay (relay means) 35 and outputs a control signal to cause the display device 50 to display the abnormality. Then, the microcomputer 32 proceeds to step S130. As a result, the relay (relay means) 35 is interrupted, and electricity supply to the electromagnetic solenoid 22 is stopped.

When the process proceeds from step S10 or from step S90 to step S120, the microcomputer 32 clears the cumulative number counter and proceeds to step S130.

When the process proceeds from step S120 or step S110 to step S130, the microcomputer 32 clears the detection period counter, and temporarily terminates the control program.

Figures 4A, 4B:
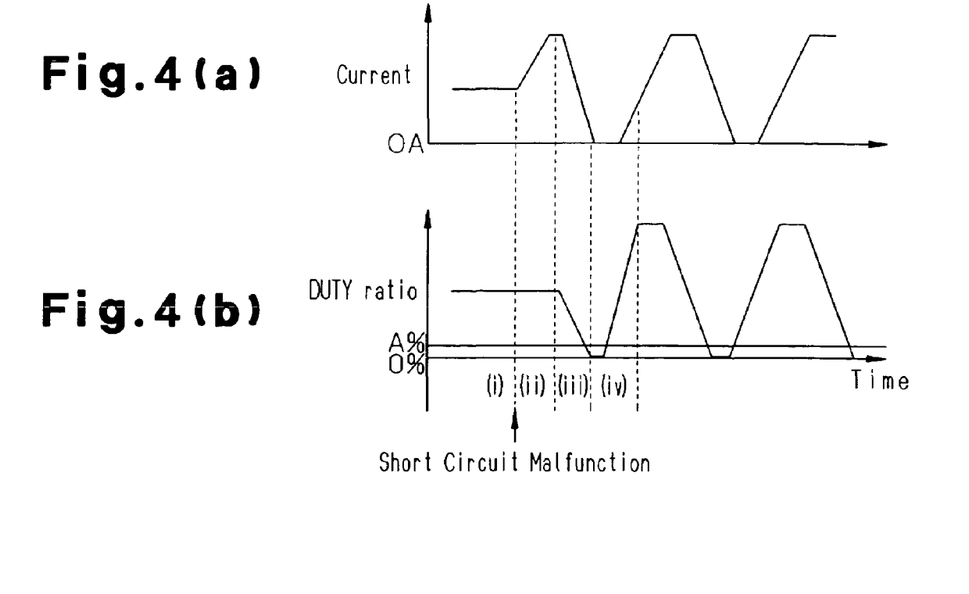
FIG. 4(a) is a diagram showing changes of an actual current (detected current) through a shunt resistor when a short circuit is established in an electromagnetic solenoid.
FIG. 4(b) is a diagram showing changes of a duty ratio corresponding to the temporal axis of FIG. 4(a)

FIG. 4(a) shows changes of the actual current (detected current) through the shunt resistor 41 when a short circuit is established in the electromagnetic solenoid 22. FIG. 4(b) shows changes of the duty ratio corresponding to the temporal axis of FIG. 4(a).

In FIG. 4(b), (i) represents a period in which the electromagnetic solenoid 22 functions normally. (ii) represents a period in which there is an abnormality due to a short circuit in the electromagnetic solenoid 22 between the terminals, and the actual current (detected current) exceeds the normal state (i). In the periods (i), (ii), the procedure of steps S10, S20, S30, S40, S80 in FIG. 3 is consecutively executed.

In FIG. 4(b), (iii) represents a period in which the fact that a current is great is detected, and a control for lowering the duty ratio accordingly is being executed.

If the duty ratio exceeds the predetermined threshold value A in this period, the procedure of steps S10, S20, S30, S40, and S80 are executed in the flowchart of FIG. 3. When the duty ratio falls below the predetermined threshold value A, the procedure of steps S10, S20, S30, S40, S50, S60, and S70 is executed in the flowchart of FIG. 3.

In a period (iv) of FIG. 4(b), since the actual current (detected current) is close to zero amperes, a state in which a control for increasing the duty ratio is shown.

If the duty ratio is less than the predetermined threshold value A in the period (iv), steps S10, S20, S30, S40, and S50 are executed in this order in the flowchart. When the duty ratio is equal to or more than the predetermined threshold value A, the procedure of steps S10, S20, S30, S40, and S80 is consecutively executed in the flowchart of FIG. 3.

Hereinafter, as described above, the cumulative number counter is incremented and the number of times of hunting is accumulated every time hunting, which includes a state in which the duty ratio is equal or more than the threshold value and a state in which the duty ratio is less than the predetermined threshold value A, is repeated.

When the detection period τ reaches the predetermined period T, and the value of the cumulative number counter (the cumulative number of times) exceeds N, steps S10, step S20, S90, S100, S110, and S130 are executed in this order in the flowchart. As a result, the relay (relay means) 35 is turned off, and the short circuit of the electromagnetic solenoid 22 is eliminated.

This embodiment has the following advantages.

(1) In the driving force distribution controlling device 31, the current command value of the electromagnetic solenoid 22 (electrical load) is set, and a current based on the PI control is supplied to the electromagnetic solenoid 22 based on the deviation between the value of the detected current through the electromagnetic solenoid 22 and the current command value.

The driving force distribution controlling device 31 has the microcomputer 32 (current determining device, or current determining means), which functions as a hunting detecting device. The microcomputer 32 determines whether current is being supplied to the electromagnetic solenoid 22. Further, when determining that there is a current, the microcomputer 32 functions as a hunting detector (hunting detector means) for detecting the number of times of hunting within the predetermined period T.

As a result, hunting in the driving force distribution controlling device 31 is detected.

(2) The driving force distribution controlling device 31 causes the microcomputer 32 to function as a duty ratio determining device (duty ratio determining means) that determines whether the duty ratio is less than the predetermined threshold value A. Further, when determining that the duty ratio is less than the predetermined threshold value A, the microcomputer 32 accumulates the number of times of determination with a cumulative number counting device, which accumulates the detection number of times according to a determination result on whether the duty ratio in the previous control cycle was less than the predetermined threshold value A.

As a result, hunting in the driving force distribution controlling device 31 is easily detected.

(3) In this embodiment, when the cumulative number of times of hunting is equal to or more than N (abnormality determination value), the microcomputer 32 (cumulative number counting device, or cumulative number counting means) functions as an abnormality determining device (abnormality determining means) for determining an abnormality. As a result, when the cumulative number of times of the hunting is equal to or more than the abnormality determination value, an abnormality determination is performed.

(4) The driving force distribution controlling device 31 of this embodiment includes a short circuit detecting device. The short circuit detecting device includes the hunting detecting device. The microcomputer 32 functions as a short circuit determining device (short circuit determining device) that, when the number of times of hunting exceeds N (predetermined number of times), determines that a short circuit is established in the electromagnetic solenoid 22. As a result, the short circuit in the electromagnetic solenoid 22 is easily determined based on the number of times of hunting.

(5) This embodiment includes the above described hunting detecting device as a short circuit detecting device. When the cumulative number of times of hunting, which is counted by the cumulative number counter of the microcomputer 32, exceeds N (predetermined number of times), it is determined that a short circuit is established in the electromagnetic solenoid 22. As a result, the short circuit in the electromagnetic solenoid 22 is easily determined based on the cumulative number of times of hunting.

(6) In this embodiment, the electromagnetic solenoid 22 (electrical load) is connected to the battery 38 (electrical power source) with the relay (relay means) 35. When the microcomputer 32 (short circuit determining device, or short circuit determining means) determines that there is a short circuit, the microcomputer 32 functions as a relay controlling device (relay controlling means) and turns off the relay (relay means) 35. As a result, a malfunction due to a short circuit in the electromagnetic solenoid 22 is determined, and the short circuit in the electromagnetic solenoid 22 (electrical load) is eliminated.

(7) In this embodiment, when the microcomputer 32 (short circuit determining device, or short circuit determining means) determines that there is a short circuit in the electromagnetic solenoid 22, the display device 50 (warning device, or warning means) informs occupants of an abnormality due to the short circuit. As a result, the existence of the short circuit abnormality in the electromagnetic solenoid 22 is not only detected but also informed to the occupants.

(8) The driving force distribution controlling device 31 according to this embodiment has the short circuit detecting device, which is recited in the advantages (4) to (7). As a result, the driving force distribution controlling device 31 has the advantages (4) to (7).

(9) The hunting detecting method according to this embodiment includes a step (S10) for determining whether there is a current through the electromagnetic solenoid 22 (an electrical load), and hunting number detecting steps (S40 to S80) for, when it is determined that there is a current, detecting the number of times of hunting before the predetermined period T elapses. As a result, the method has the advantage (1).

(10) In the hunting detecting method according to this embodiment, the hunting number detecting step includes a determining step (S40) for determining whether the duty ratio is less than the predetermined threshold value. Further, the hunting number detecting step includes the cumulative number counting steps (S50, S60), in which, when the duty ratio is determined to be less than the predetermined threshold value in S40 (determining step), the determination number of times is accumulated according to the determination result of the determining step in the previous control cycle. As a result, the method has the advantage (2).

(11) In addition to the hunting detecting method of the advantage (9), the short circuit detecting method according to this embodiment includes a short circuit determining steps (S90, S100) that determine that there is a short circuit when the number of times of hunting exceeds N (predetermined number of times). As a result, the method has the advantage (4).

(12) In addition to the hunting detecting method of the advantage (10), the short circuit detecting method according to this embodiment includes a short circuit determining step (S90, S100) that determines that there is a short circuit when the cumulative number of times in the cumulative number counting step (S50, S60) exceeds N (predetermined number of times). As a result, the method has the advantage (5).

The above embodiment of the present invention may be modified as follows.

In the above embodiment, the present invention is applied to the four wheel drive vehicle 11, in which the front wheels are always driven when the vehicle 11 is running. However, the present invention may be applied to a four wheel drive vehicle, in which the rear wheels are always driven when the vehicle is running. This modification has the same advantages as the above embodiment.

In the above embodiment, to eliminate the deviation between the current command value and the actual current (detected current) through the electromagnetic solenoid 22, the microcomputer 32 performs the PI control. However, the microcomputer 32 may perform a P control (proportional control) or the PID control (proportional, integral, and differential control).

To accelerate the response, the D control is added to the PI control when the PID control is performed. In this case, a value that is proportionate to the changing speed of a deviation is added to a value obtained through the PI control, which improves the response to the changing speed of the deviation. As a result, the changes of output values outputted by the microcomputer 32 are accelerated, which accelerate the hunting detection.

In the above embodiment, the display device 50 functions as a warning device (warning means). However, a speaker that generates warning sound or a warning sound generating device that generates warning message with a voice synthesizing circuit may be used as a warning device (warning means).

In the above embodiment, the driving force distribution controlling device 31 functions as an electrical load controlling device, a short circuit detecting device, a hunting detecting device. However, the driving force distribution controlling device 31 may function as other devices. For example, a motor controller for controlling an electric motor, which is an electrical load, may function as an electrical load controlling device, a short circuit detecting device, and a hunting detecting device. In this case, hunting due to a short circuit in a coil of the motor is detected. Also, a short circuit is detected.

A driving force distribution controlling device 31 according to a second embodiment of the present invention will be described with reference to FIGS. 5 to 9. The driving force distribution controlling device 31 is used in a four wheel drive vehicle 11, in which the front wheels are always driven when the vehicle 11 is running. Mainly, the difference form the first embodiment will be discussed below.

Figure 5:
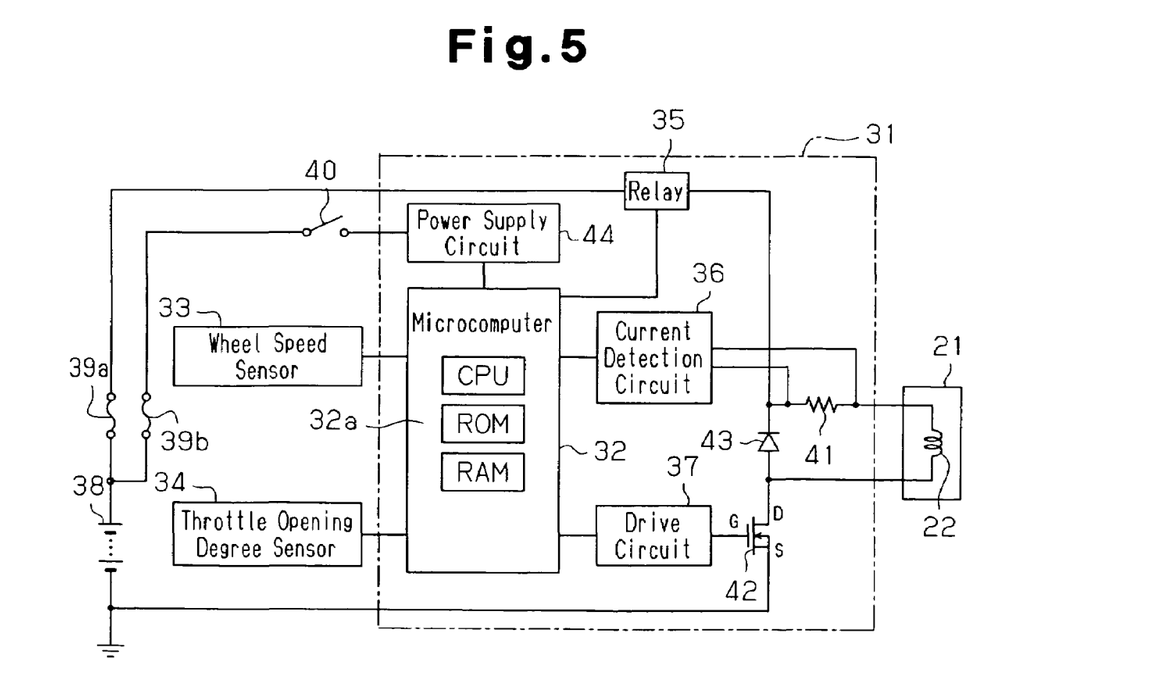
FIG. 5 is a circuit diagram illustrating a driving force distribution controlling device according to a second embodiment.

The electromagnetic solenoid 22 corresponds to an electrical load circuit such as an inductive load circuit. The microcomputer 32 corresponds to an inductive load circuit controller, a first timer device, a second timer device, a test current generator, a counter device, a short circuit determining device (short circuit determining device), a setting device, and a vehicle stop determination device.

A wheel speed signal is used as a control parameter representing a wheel speed. A depression amount signal is used as a control parameter representing a throttle opening degree.

The four wheel drive vehicle 11 has a battery 38. The positive terminal of the battery 38 is connected to a series circuit, which includes a fuse 39*a*, a relay (relay means) 35, a shunt resistor 41, the electromagnetic solenoid 22, and a field-effect transistor 42 (hereinafter referred to as FET 42). Also, the positive terminal of the battery 38 is connected to a microcomputer 32 with a fuse 39*b*, an ignition switch 40, and a power supply circuit 44.

When the ignition switch 40 is turned on (closed), electricity is supplied to the microcomputer 32 from the battery 38 to the microcomputer 32 through the power supply circuit 44. Then, based on various information (detected signals) from the wheel speed sensors 33 and the throttle opening degree sensor 34, the microcomputer 32 executes various control programs such as a program for controlling the driving force distribution, and computes the amount of the current (duty ratio) supplied to the electromagnetic solenoid 22.

Specifically, based on various information obtained from the wheel speed sensors 33 and the throttle opening degree sensor 34 (detected signals), the microcomputer 32 generates or sets the current command value of the electromagnetic solenoid 22. The microcomputer 32 then computes a PI control value through PI control (proportional-plus-integral control) to eliminate the deviation between the current command value and the actual current or a detected current through the electromagnetic solenoid 22. Further, the microcomputer 32 performs PWM computation according to the computed PI control value to determine the duty ratio. The microcomputer 32 sends the result of the computation to the drive circuit 37.

The drive circuit 37 performs on/off control (PWM control) of the FET 42, such that a current corresponding to the duty ratio is supplied to the electromagnetic solenoid 22. That is, the microcomputer 32 controls the amount of current supplied to the electromagnetic solenoid 22, thereby variably controlling the driving force distribution to the front wheels and the rear wheels.

Based on detected signals from the wheel speed sensors 33 and the throttle opening sensor 34, the microcomputer 32 determines whether a vehicle stopping condition is satisfied. If the condition is satisfied, the microcomputer 32 sets the duty ratio to zero.

An operation of the driving force distribution controlling device 31 as described above will now be described with reference to FIGS. 6 and 7.

Figure 6:
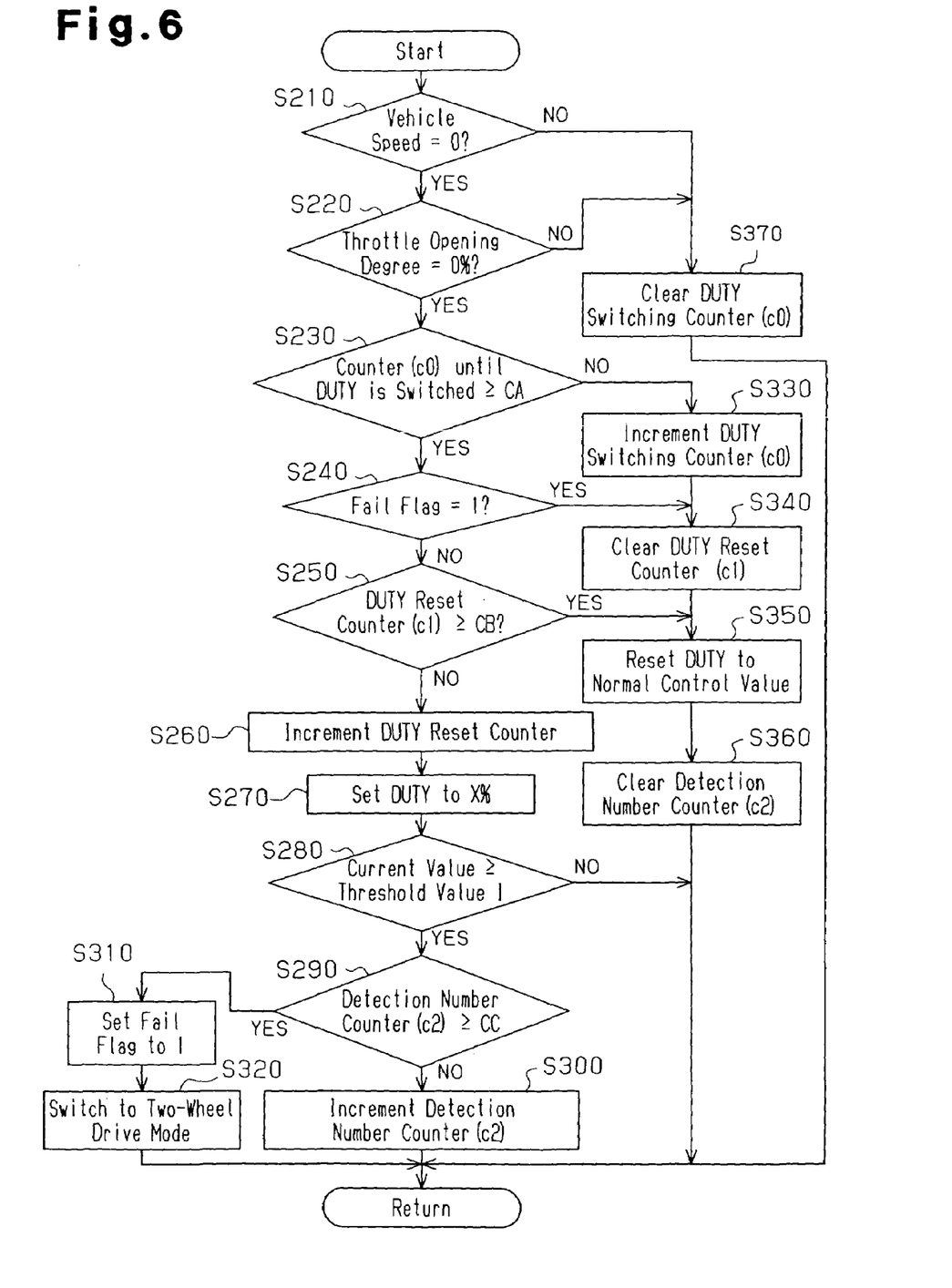
FIG. 6 is a flowchart showing a program of a short circuit detection according to the second embodiment.

FIG. 6 is a flowchart showing a program for detecting a short circuit. This program is stored in the ROM 32a in advance and is executed by the microcomputer 32 of the driving force distribution controlling device 31. The microcomputer 32 executes this control program at a predetermined control cycle.

Step S210 and step S220 are steps for determining whether the vehicle stopping condition is satisfied. In step S210, the microcomputer 32 determines whether the vehicle speed is 0 km/h based on detected signals from the wheel speed sensors 33. If the vehicle speed is 0 km/h, the microcomputer 32 proceeds to step S220. In step S220, the microcomputer 32 determines whether the throttle opening degree is 0% based on a detected signal from the throttle opening degree sensors 34.

If the outcome of step S210 or step S220 is negative, the microcomputer 32 proceeds to step S370.

If the outcomes of step S210 and step S220 are positive, it is judged that the vehicle stopping condition is satisfied, and the process proceeds to step S230.

In step S230, whether the value of a duty switching counter (c0) is equal to or more than a threshold value CA is determined. When the value of the duty switching counter (c0) reaches the threshold value CA, the duty ratio is switched. The threshold value CA is set in advance to correspond to a period (vanishing period) from when a counter electromotive current is generated in the electromagnetic solenoid 22 to when the current vanishes. The threshold value CA is determined to be longer than the vanishing period.

When the vehicle is stopped, the duty ratio becomes zero. The counter electromotive current is a current that is generated in the electromagnetic solenoid 22 (an inductive load) due to the fact that current to the electromagnetic solenoid 22 becomes zero according to the duty ratio.

If the value of the counter (c0) is equal to or more than the threshold value CA in step S230, the microcomputer 32 judges that the outcome is positive, and proceeds to step S240. If the value of the counter (c0) is less than the threshold value CA in step S230, the microcomputer 32 judges that the outcome is negative, and proceeds to step S330.

In step S240, the microcomputer 32 determines whether a fail flag is set. The fail flag represents a wiring abnormality. If the fail flag is set, the process proceeds to step S340.

If the fail flag representing a wiring abnormality is not set, the process proceeds to step S250. In step S250, the microcomputer 32 determines whether a duty reset counter (c1) is equal to or more than a threshold value CB.

If the value of the counter (c1) is less than threshold value CB, the process proceeds to step S260. If the value of the counter (c1) is equal to or more than the threshold value CB, the process proceeds to step S350.

In step S260, the microcomputer 32 increments the reset counter (c1), and proceeds to step S270.

In step S270, the microcomputer 32 sets the duty ratio to X %, and sends a control signal corresponding to the set duty ratio to the drive circuit 37. The drive circuit 37 supplies a test current having this duty ratio to the electromagnetic solenoid 22. Then, the process proceeds to step 280.

In step S280, microcomputer 32 determines whether the detected current value is equal to or more than the threshold value I. If the detected current is less than the threshold value I, the microcomputer 32 temporarily terminates the flowchart. If the detected current value is equal to or more than threshold value I, the process proceeds to step S290. The threshold value I corresponds to a first threshold value. The threshold value I is greater than the theoretical value of a current that is supplied to the solenoid 22 when the duty ratio is X %.

In step S290, the microcomputer 32 determines whether a detection number counter (c2) is equal to or more than a threshold value CC. If the detection number counter (c2) is equal to or more than threshold value CC, the inductive load circuit, or the electromagnetic solenoid 22, is determined to have a wiring abnormality. In this case, the process proceeds to step S310. If the detection number counter (c2) is less than the threshold value CC in step S290, the process proceeds to step S300. The threshold value CC corresponds to a second threshold value.

In step S300, the microcomputer 32 increments the value of the detection number counter (c2) and temporarily terminates the flowchart.

If the outcome of step S290 is positive, the microcomputer 32 sets the fail flag to one in step S310, and then proceeds to step S320.

In step S320, the duty ratio is set to a value that corresponds to a two wheel drive mode for causing the vehicle to operate in the two wheel drive mode. Then, the flowchart is temporarily terminated.

In step S330, since the process has proceeded from step S230, the microcomputer 32 increments the duty switching counter (c0) and proceeds step S340.

When the process proceeds to step S340 from step S240 or step S330, the microcomputer 32 clears the duty reset counter (c1) in step S340, and proceeds to step S350.

When the process proceeds to step S350 from step S250 or step S340, the microcomputer 32 resets the duty ratio to a normal control value in step S350, and proceeds to step S360. The normal control value refers to a duty ratio that is computed when the vehicle is not moving.

In step S360, the microcomputer 32 clears the value of the detection number counter (c2) and temporarily terminates the flowchart.

If the vehicle speed is not 0 km/h in step S210 or if the throttle opening degree is not 0% in step S220, the process proceeds to step S370. In step S370, the microcomputer 32 clears the duty switching counter (c0), and temporarily terminates the flowchart.

Figure 7:
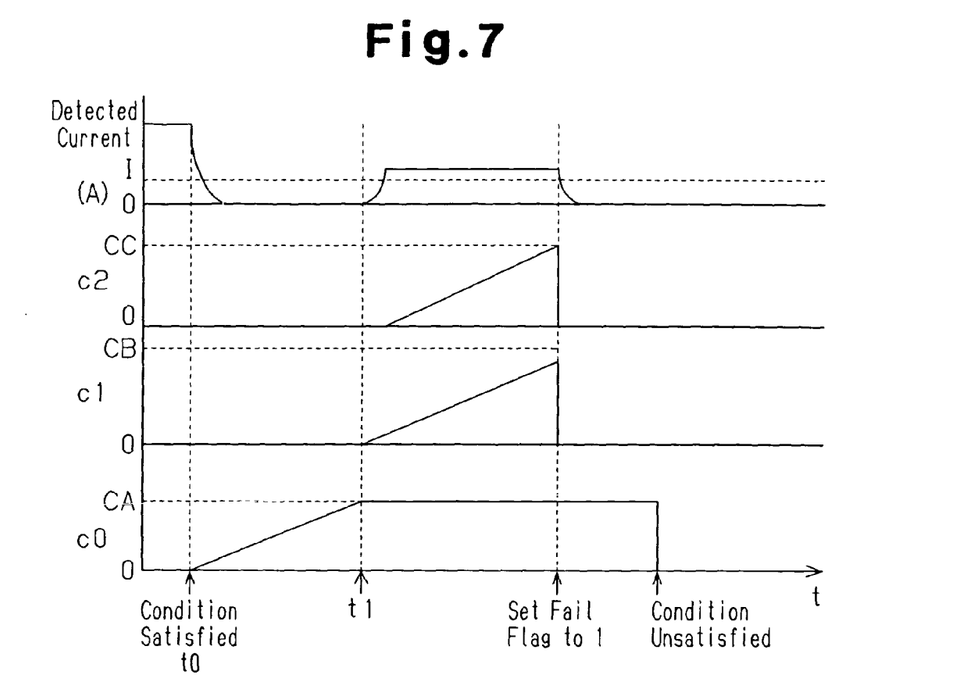
FIG. 7 is a timing chart showing a procedure performed according to the flowchart of the short circuit detection program.
Figure 8:
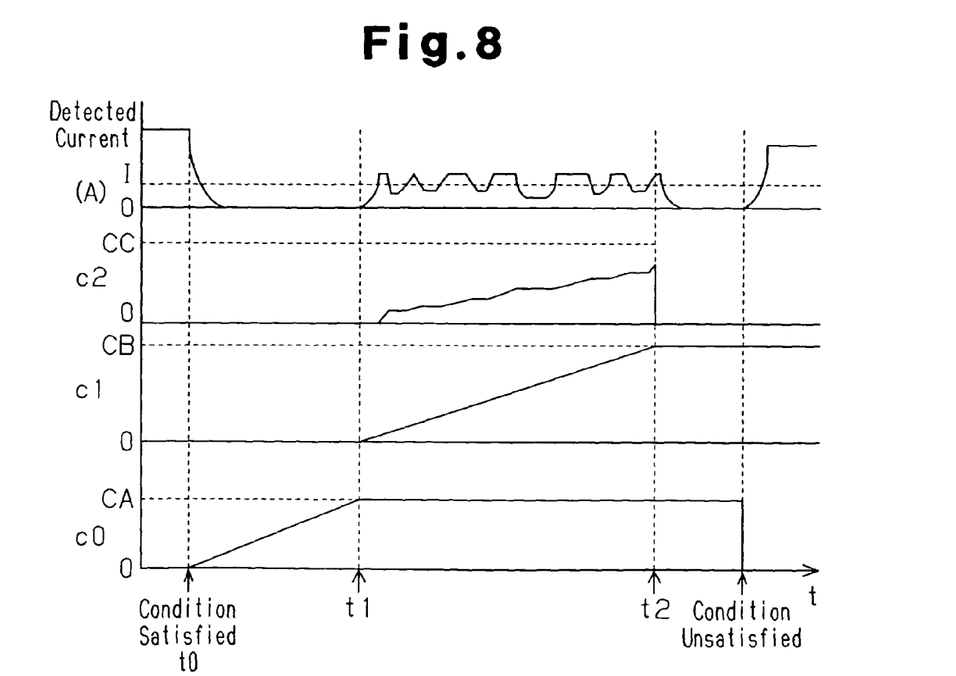
FIG. 8 is a timing chart showing a procedure performed according to the flowchart of the short circuit detection program.
Figure 9:
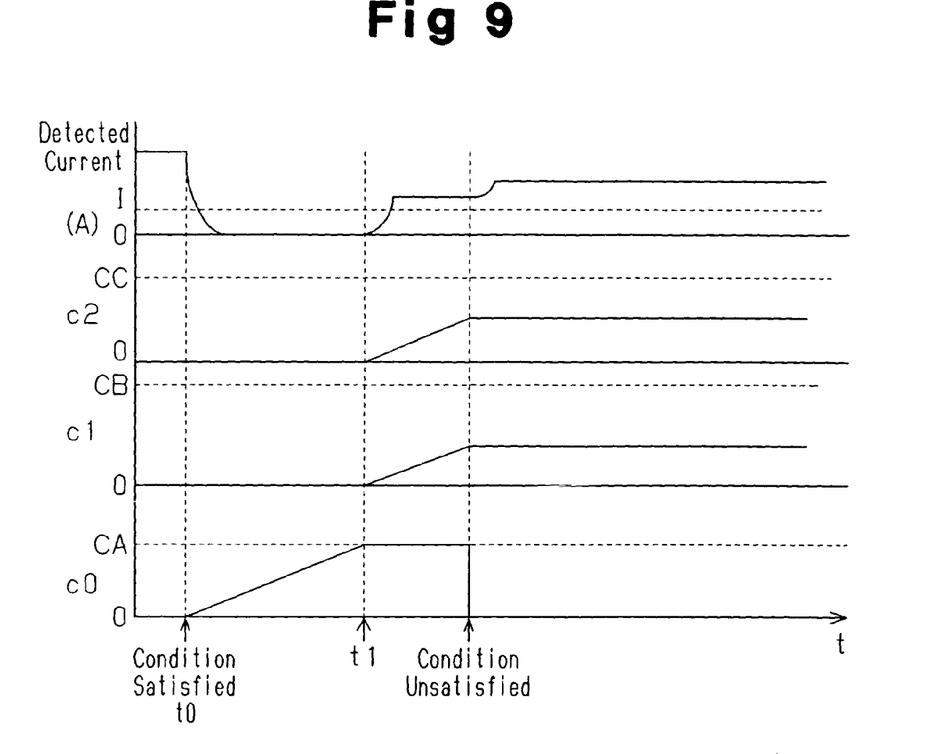
FIG. 9 is a timing chart showing a procedure performed according to the flowchart of the short circuit detection program.

FIGS. 7 to 9 are timing charts showing a procedure performed according to the flowchart of the short circuit detection program. In FIGS. 7, 8, and 9, the vertical axes represent the values of the counters c0, c1, c2 and the value (ampere) of the detected current. The horizontal axes represent time. "Condition" at the horizontal axes represents "the vehicle stopping conditions".

In each chart, the detected current gradually attenuates after time t0 from when the condition is satisfied (time t0) to time t1. This represents that a counter electromotive current of the electromagnetic solenoid 22, or an inductive load, is detected. The period from time t0 to time t1 (t1 period) is equal to a period in which the duty switching counter (c0) reaches the threshold value CA.

FIG. 7 shows an example in which a short circuit detection is executed.

Before time t0, the outcome of step S210 or step S220 is negative every time the flowchart is executed, and the procedure of step S370 is executed.

In the period from time t0 to time t1, the outcomes of S110 and S120 are both positive every time the flowchart is executed, and the outcome of step S230 is negative. Thus, the procedure from step S330 to step S360 is executed.

In a period from time t1 until when the "fail flag is set to one", the detected current exceeds the threshold value I, and continues to be above the threshold value I. From time t1 until the detected current exceeds the threshold value I, the procedure from step S210 to step S280 is executed every time the flow chart is executed, and the flowchart is terminated.

After time t1, if the detected current exceeds the threshold value I, the procedure from step S210 to step S300 is executed every time the flowchart is executed. In the procedure from step S210 to step S300, if the detection number counter (c2) exceeds the threshold value CC in step S290, the fail flag is set to one in step S310. In step S320, the two wheel drive mode is selected.

After the fail flag is set to one, the vehicle drives in the two wheel drive mode. Therefore, the current to the electromagnetic solenoid 22 is stopped, and the detected current is gradually attenuated to zero.

Thereafter, when the vehicle stopping condition is not satisfied, that is, when the vehicle starts moving, the outcome of step S210 or step S220 is negative in the flowchart. Therefore, the procedure of step S370 is executed, and the duty switching counter (c0) is cleared.

FIG. 8 shows an example in which the detected current exceeds the threshold value I at a rate less than that of the example of FIG. 7, and no short circuit is detected. That is, FIG. 8 shows a case in which, after the stopping condition is satisfied, the detection number counter (c2) is less than the threshold value CC and the duty reset counter (c1) has finished counting.

Time t2 is a time at which the duty reset counter (c1) reaches the threshold value CB after time t1.

In FIG. 8, the procedure of the flowchart in the period from t0 to t1 is the same as that of the example of FIG. 7. The detailed description is therefore omitted.

In the period from time t1 to time t2, if the value of the detected current is equal to or more than the threshold value I, the processes step S210 to step S300 are executed every time the flowchart is executed. In the period from time t1 to time t2, if the value of the detected current is less than the threshold value I, the processes step S210 to step S280. Then, the flowchart is terminated.

When the duty reset counter (c1) reaches the threshold value CB at time t2, the outcome of step S250 is positive. Thus, procedures of step S350 and step S360 are executed. That is, the duty ratio is reset to the normal control value, and the detection number counter (c2) is cleared. The period (t2−t1) from time t1 to time t2 corresponds to the output period of the test current.

Thereafter, when the stopping condition is not satisfied, that is, when the vehicle starts moving, the outcome of step S210 or step S220 is negative in the flowchart. Therefore, the procedure of step S370 is executed, and the duty switching counter (c0) is cleared. In a case where no short circuit of the electromagnetic solenoid is detected, the electromagnetic solenoid 22 is controlled according to a normal four wheel drive mode while the vehicle is traveling, and the detected current is detected.

FIG. 9 is a timing chart of an example, in which, after the stopping condition of the vehicle is satisfied, the stopping condition is not satisfied while a current of the duty ratio of X % is being outputted after.

In FIG. 9, the procedure of the flowchart in the period from t0 to t1 is the same as that of the example of FIG. 7. The detailed description is therefore omitted.

In a period from time t1 to when the "stopping condition is not satisfied", the detected current exceeds the threshold value I and is kept above the threshold value I thereafter.

Therefore, from time t1 until the detected current exceeds the threshold value I, the procedure from step S210 to step S280 are executed every time the flow chart is executed, and the flowchart is terminated. After time t1, if the detected current exceeds the threshold value I, the procedure from step S210 to step S300 are executed every time the flowchart is executed.

If the vehicle stopping condition is not satisfied before the duty reset counter (c1) reaches the threshold value CB and before the detection number counter (c2) reaches the threshold value CC, the outcome of step S210 or step S220 is negative in the above flowchart, and the procedure of step S370 is executed. That is, the duty switching counter (c0) is cleared. Since no short circuit is detected, the electromagnetic solenoid 22 is controlled according to a normal four wheel drive mode while the vehicle is traveling, and the detected current is detected.

This embodiment has the following advantages.

(1) The ratio of driving force transmitted to the wheels from the engine 12 (drive source) with a driving force transmission system is adjusted by the electromagnetic solenoid 22 (electrical load circuit such as an inductive load circuit). The driving force distribution controlling device 31 of this embodiment has a microcomputer 32 (controller), which controls the electromagnetic solenoid 22. After the vehicle is stopped, a time (t1) for a counter electromotive current generated in the electromagnetic solenoid 22 to vanish is measured by the first timer.

The microcomputer 32 (controller) sends the test current to the electromagnetic solenoid 22 after time t1. Further, while outputting the test current, the microcomputer 32 counts the number of times by which the detected current detected by the current detection circuit 36 provided in the electromagnetic solenoid 22 exceeds the threshold value I (first threshold value). When the number of times by which the detected current exceeds the first threshold value I exceeds the second threshold value CC, the microcomputer 32 determines that there is a short circuit abnormality in the electromagnetic solenoid 22.

As a result, a malfunction due to a short circuit in the electromagnetic solenoid 22 is detected.

(2) The microcomputer 32 of the driving force distribution controlling device 31 according to this embodiment functions as the second timer and measures the output period of the test current. For example, when the output period reaches a predetermined output period represented by (t2–t1), the microcomputer 32 stops outputting the test current.

As a result, if the number of times the detected current exceeds the first threshold value I exceeds the second threshold value CC in the predetermined period, a malfunction due to a short circuit in the electromagnetic solenoid 22 is determined.

(3) Based on the determination result that there is a short circuit, the microcomputer 32 adjusts the current supplied to the electromagnetic solenoid 22 to a ratio that corresponds to the driving force in the two wheel drive mode, thereby activating the electromagnetic solenoid 22. As a result, when it is determined that there is a malfunction due to a short circuit in the electromagnetic solenoid 22, the driving state of the vehicle is switched to the two wheel drive mode.

(4) The microcomputer 32 of this embodiment determines whether the vehicle has stopped based on detected signals (control parameter) from the wheel speed sensors 33 and a detected signal (control parameter) from the throttle opening degree sensor 34.

Based on the determination that the vehicle has stopped, the microcomputer 32 measures the period t1 required for a counter electromotive current of the electromagnetic solenoid 22, which current is generated after the vehicle has stopped, to vanish.

As a result, stopping of the vehicle is accurately determined in response to the control parameters input, and then, the time required for a counter electromotive current generated in the electromagnetic solenoid 22 to vanish is accurately measured.

(5) In this embodiment, the control parameters are the wheel speed signals and the depression amount signal.

As a result, whether the vehicle stopping condition is satisfied is easily determined based on the signals.

The second embodiment may be modified as follows.

In the second embodiment, whether the vehicle stopping condition is satisfied is determined based on the vehicle speed signals and the depression amount signal. Instead, whether the vehicle stopping condition is satisfied may be determined based on the command current and the vehicle speed signals. That is, it may be determined that the vehicle stopping condition is satisfied when the command current is zero (duty ratio is zero) and the vehicle speed is zero.

Figure 10:
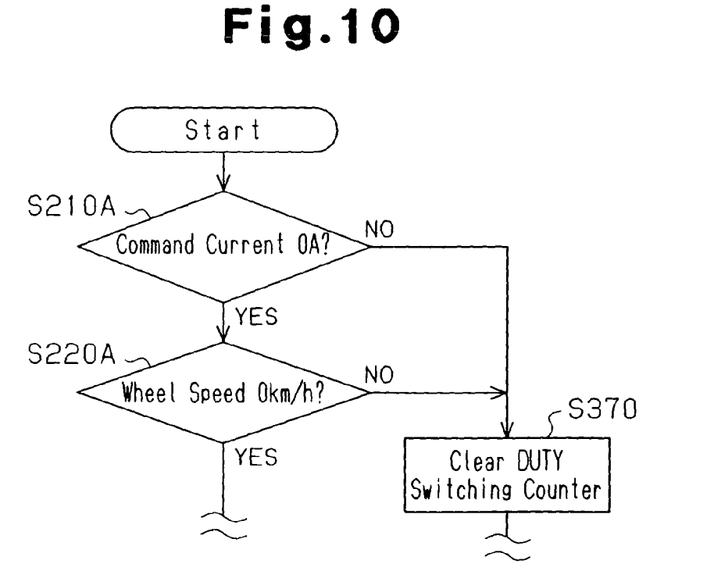
FIG. 10 is a flowchart showing a program of a short circuit detection according to another embodiment.

In this case, as shown in FIG. 10, step S210 and step S220 of FIG. 6 are replaced with step S210A and step S220A.

In this modification, the microcomputer 32 (inductive load circuit controller) controls the electromagnetic solenoid 22 (inductive load circuit) based on the duty ratio (command current). A control parameter for determining the vehicle stopping condition is a command current generated by the microcomputer 32 for controlling the electromagnetic solenoid 22 and the wheel speed parameter sent to the microcomputer 32. As a result, whether the vehicle stopping condition is satisfied is easily determined based on the control parameters.

In the second embodiment, the present invention is applied to the four wheel drive vehicle 11, in which the front wheels are always driven when the vehicle 11 is running. However, the present invention may be applied to a four wheel drive vehicle, in which the rear wheels are always driven when the vehicle is running. This modification has the advantages (1) to (5) of the second embodiment.

In the second embodiment, the determination of a wire abnormality of step S240 is placed after step S230. However, step S240 may be placed before step S210.

Therefore, the present examples and embodiments are to be considered as illustrative and not restrictive and the invention is not to be limited to the details given herein, but may be modified within the scope and equivalence of the appended claims.

What is claimed is:

1. A hunting detecting device for an electrical load controlling device, wherein the electrical load controlling device is configured to set a current command value for an electrical load, wherein, based on a deviation between a current that actually flows through the electrical load and the current command value, the electrical load controlling device further performs at least proportional control in a group including proportional control, integral control, and differential control, wherein the electrical load controlling device is further configured to send a current generated based on the control being performed to the electrical load, the hunting detecting device comprising:

a current determining device configured to determine whether there is a current through the electrical load; and a hunting detector configured to count each time when the current through the electrical load determined to be present by the current determining device drops below a predetermined low level within a predetermined period of time as a hunting condition.

2. The hunting detecting device according to claim 1, wherein the hunting detector includes:

a duty ratio determining device configured to determine whether a duty ratio related to the current through the load is less than a predetermined threshold value so as to determine that the current through the electrical load determined to be present by the current determining device has dropped below the predetermined level close to zero and a counter device configured to count the number of times the duty ratio determining device determines that the duty ratio is less than the predetermined threshold value within the predetermined period of time so as to count the number of times that the hunting condition occurs.

3. The hunting detecting device according to claim 2, further comprising an abnormality determining device, wherein, when the cumulative number counted by the counter device has reached an abnormality determination value, the abnormality determining device is configured to determine that there is an abnormality.

4. A short circuit detecting device for an electrical load controlling device, having the hunting detecting device according to claim 2, the short circuit detecting device further comprising:

a short circuit determining device, wherein, when the number of times counted by the counter device has reached a predetermined number, the short circuit determining device is configured to determine that there is a short circuit in the electrical load.

5. A short circuit detecting device for an electrical load controlling device, having the hunting detecting device according to claim 1, the short circuit detecting device further comprising:

a short circuit determining device, wherein, when the number of times that the hunting condition occurs within the predetermined period of time exceeds a predetermined number, the short circuit determining device is configured to determine that there is a short circuit in the electrical load.

6. The short circuit detecting device according to claim 5, wherein the short circuit detecting device further includes,
an electrical power source,
a relay device, and
a relay controlling device, wherein
the electrical load is connected to the electrical power source with the relay device, and wherein,
when the short circuit determining device determines that there is a short circuit in the electrical load, the relay controlling device is configured to turn off the relay device.

7. The short circuit detecting device for an electrical load controlling device according to claim 5, further comprising a warning device, wherein, when the short circuit determining device determines that there is a short circuit in the electrical load, the warning device is configured to warn of existence of the short circuit.

8. A driving force distribution controlling device having the short circuit detecting device according to claim 5, wherein the driving force distribution controlling device is configured to control a driving force distributing device is configured to adjust a ratio of driving force that is distributed from a power source of a vehicle to front wheels and rear wheels of the vehicle via a driving force transmitting system, wherein the driving force distributing device includes the electrical load configured to adjust the ratio of the driving force; and wherein the driving force distribution controlling device functions as the electrical load controlling device.

9. A hunting detecting method for controlling a current through an electrical load, comprising steps of:
setting a current command value for the current through the electrical load;
sending a current to the electrical load;
detecting the current actually flowing through the electrical load; and
performing control of the current based on a deviation between the detected current and the current command value, wherein
the control is selected from a group including proportional control, the combination of proportional control and integral control, the combination of proportional control and differential control, and the combination of proportional control integral control, and differential control, the method further comprising steps of,
determining whether there is a current through the electrical load; and
counting each time when the current through the electrical load determined to be present by the determining step drops below a predetermined low level within a predetermined period of time as a hunting condition.

10. The hunting detecting method according to claim 9, wherein the counting step includes,
determining whether a duty ratio related to the current through the electrical load is less than a predetermined threshold value as said predetermined low level; and
counting the number of times that the duty ratio determining step determines that the duty ratio is less than the threshold value within the predetermined period of time as said counting each time when the current through the electrical load determined to be present by the determining step drops below a predetermined low level within a predetermined period of time.

11. The hunting detecting method according to claim 10, further comprising:
determining that there is a short circuit in the electrical load when the number of times it is counted that the duty ratio determining step determines that the duty ratio is less than the threshold value within the predetermined period of time exceeds a predetermined number.

12. The hunting detecting method according to claim 9, further comprising:
determining that there is a short circuit in the electrical load when the number of times that the hunting condition occurs exceeds a predetermined number.

13. A driving force distribution controlling device for a four wheel drive vehicle, wherein the driving force distribution controlling device controls an inductive load circuit that adjusts a ratio of driving force that is distributed from a power source to a plurality of wheels via a driving force transmitting system, the driving force distribution controlling device comprising: a detecting device for detecting a current through the inductive load circuit; a first timer device for measuring a period required for a counter electromotive current, which is generated in the inductive load circuit after the vehicle is stopped, to vanish; a test current outputting device, wherein after the first timer device completes measuring, the test current outputting device outputs a test current to the inductive load circuit; a counting device, wherein, while the test current is being outputted, the counting device counts the number of times the current detected by the detecting device exceeds a first threshold value; and a short circuit determining device, wherein, when the number of times the detected current exceeds the first threshold value is at least a predetermined second threshold value, the short circuit determining device determines that there is a short circuit in the inductive load circuit.

14. The driving force distribution controlling device for a four wheel drive vehicle according to claim 13, further comprising a second timer device for measuring a period during which the test current is outputted, and wherein, when the period measured by the second timer device reaches a predetermined period, the test current outputting device stops outputting the test current.

15. The driving force distribution controlling device for a four wheel drive vehicle according to claim 13, wherein, based on the determination result of the short circuit determining device, the amount of current supplied to the inductive load circuit is set in accordance with a two wheel drive mode.

16. The driving force distribution controlling device for a four wheel drive vehicle according to claim 13, further comprising: a vehicle stop determining device for determining whether the vehicle is in a stopped state based on a control parameter; wherein the first timer device starts operation based on the determination result of the vehicle stop determining device.

17. The driving force distribution controlling device for a four wheel drive vehicle according to claim 16, wherein the control parameter is a wheel speed parameter and a throttle opening degree parameter.

18. The driving force distribution controlling device for a four wheel drive vehicle according to claim 16, wherein the inductive load circuit is driven based on a command current; and wherein the control parameter is the command current and a wheel speed parameter.

19. The driving force distribution controlling device for a four wheel drive vehicle according to claim 13, wherein the driving force transmitting system includes an electromagnetic clutch mechanism.

20. The driving force distribution controlling device for a four wheel drive vehicle according to claim 19, wherein the driving force transmitting device includes an electromagnetic solenoid for controlling the electromagnetic clutch mechanism, and wherein the electromagnetic solenoid forms the inductive load circuit.

21. The driving force distribution controlling device for a four wheel drive vehicle according to claim 19, wherein a shunt resistor is connected between the electromagnetic solenoid and the detecting device, and wherein the detecting device detects a current through the electromagnetic solenoid by detecting a current through the shunt resistor.

* * * * *